US005724555A

United States Patent [19]

Wadsworth

[11] Patent Number: 5,724,555

[45] Date of Patent: Mar. 3, 1998

[54] NETWORK INTERFACE BOARD FOR DIGITAL COPIER

[75] Inventor: Robert D. Wadsworth, Costa Mesa, Calif.

[73] Assignee: Canon Kabushiki Kaisha, Tokyo, Japan

[21] Appl. No.: 409,034

[22] Filed: Mar. 23, 1995

[51] Int. Cl.[6] .................................................. G06F 13/00

[52] U.S. Cl. .................... 395/500; 395/200.05; 395/308; 395/309; 399/411; 358/468

[58] Field of Search .............................. 395/500, 200.05, 395/308, 309; 364/488, 491, 578; 399/411; 358/468

[56] References Cited

U.S. PATENT DOCUMENTS

| | | | |
|---|---|---|---|
| 4,905,098 | 2/1990 | Sakata | 358/468 |
| 5,396,616 | 3/1995 | Venable | 395/500 |
| 5,455,950 | 10/1995 | Vasseur et al. | 395/200.07 |
| 5,506,657 | 4/1996 | Ito | 399/411 |

FOREIGN PATENT DOCUMENTS

| | | | |
|---|---|---|---|
| 524071 | 1/1993 | European Pat. Off. | G06F 9/46 |
| 598513 | 5/1994 | European Pat. Off. | G06F 13/12 |
| 5-292240 | 11/1993 | Japan | H04N 1/00 |

OTHER PUBLICATIONS

"Printer Attachment/Server Architecture for Token Ring Local Area Network", IBM Technical Disclosure Bulletin, vol. 33, No. 3a, Aug. 1991, pp. 407–408.

*Primary Examiner*—Kevin J. Teska

*Assistant Examiner*—Vuthe Siek

*Attorney, Agent, or Firm*—Fitzpatrick, Cella, Harper & Scinto

[57] ABSTRACT

A network interface board which breaks out the functionality of a digital copier, namely scanning functionality and printing functionality, and makes that functionality available to local area network users. The functionality is made available to the local area network users in a multi-tasking environment by which different functionality is available to the different users concurrently. Specifically, a digital copier which includes a scanner part and a printer part includes an interface bus by which image data for the scanner part and the printer part is accessible. A multi-device controller is connected to the interface bus such that the multi-device controller provides interface to the scanner part and to the printer part. The multi-device controller also provides an interface to additional option boards via an MDC bus and a video bus. A network interface board is connected on one end to the MDC bus and to the video bus and is connected on the other end to a local area network. The network interface board includes a multi-tasking operating system which provides multiple network users with concurrent and independent access to each of the scanner part and the printer part.

28 Claims, 12 Drawing Sheets

NETWORK INTERFACE BOARD FOR DIGITAL COPIER

BACKGROUND OF THE INVENTION

1. Field of the Invention

The present invention concerns a network interface board by which the functionality of a digital copier is made available to users of a computerized local or wide area network. More particularly, the present invention is a network interface board which cooperatively communicates with a multi-device controller which controls both the network interface board as well as other interface boards so as to make the functionality of a digital copier, such as scanning and printing functionality available to users of a computerized network.

2. Description of the Related Art

With increasing popularity of computerized local and wide area networks (hereinafter "LAN"), the industry has concentrated on providing a wide variety of peripherals with direct access to the LAN. Thus, for example, there are now interface boards which provide direct network interface for a printer (for example, Ser. No. 07/978,369, filed Nov. 18, 1992 and assigned to the assignee of the present invention), for interfacing a facsimile machine directly to a network, and for interfacing a scanner directly to a network. Recently, it also has been considered to connect a digital copier directly to a LAN so as to provide the functionality of a copier directly to users of the LAN. More particularly, a digital copier includes both a scanner and a printer. It has therefore been considered to provide the functionality of a scanner and a printer, both contained in the digital copier, to users of a LAN.

Despite these advances, there still exists a need for improvement. Particularly, with currently contemplated systems, it is only possible to perform one task at any one time. For example, if one network user is utilizing scanner functionality of the digital copier, it is not possible for a second network user to concurrently use printer functionality of the digital copier. Accordingly, there exists a need for a multi-tasking capability by which the functionality of a digital copier can be made available concurrently to network users.

In addition, there also exists a need by which additional functionality of networked peripherals, such as facsimile capability or specialized image processing capabilities, can be made available to network users concurrently with each other and concurrently with the scanner and printer functionality of a digital copier.

SUMMARY OF THE INVENTION

These needs are addressed by the present invention in which a network interface board makes the multiple functionality of a digital copier available to local area network users and does so in a concurrent processing environment by which different functionality is available to different users concurrently.

More particularly, the present invention is a network interface board which cooperatively communicates with other controllers on a multi-device controller. The multi-device controller breaks out the peripheral capabilities of a digital copier such as by providing direct access to the video bus of the digital copier whereby the multi-device controller is able to break the digital copier into a digital scanner and a digital printer. The multi-device controller controls the network interface board as well as other boards which are connected to the multi-device controller such as facsimile boards, image processor boards, and the like. The network interface board interfaces to the LAN so as to provide network users with access to the devices controlled by the multi-device controller as well as with access to the digital scanner and printer capabilities of the digital copier. The network interface board operates in a multi-tasking environment whereby multiple network users are able to access this functionality concurrently. For example, because of the multi-tasking capability of the interface board, it is possible for one network user to print a document on the digital copier, a second network user to scan a document concurrent with the first network user's printing of his document, and, in cases where the multi-device controller includes facsimile capability, a third network user to send a facsimile concurrently with the first and second network users' jobs.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIGS. 9(*b*) and 9(*c*) are examples of chip select logic used in the present invention.

DETAILED DESCRIPTION OF THE PREFERRED EMBODIMENT

1. System Description

Figure 1:
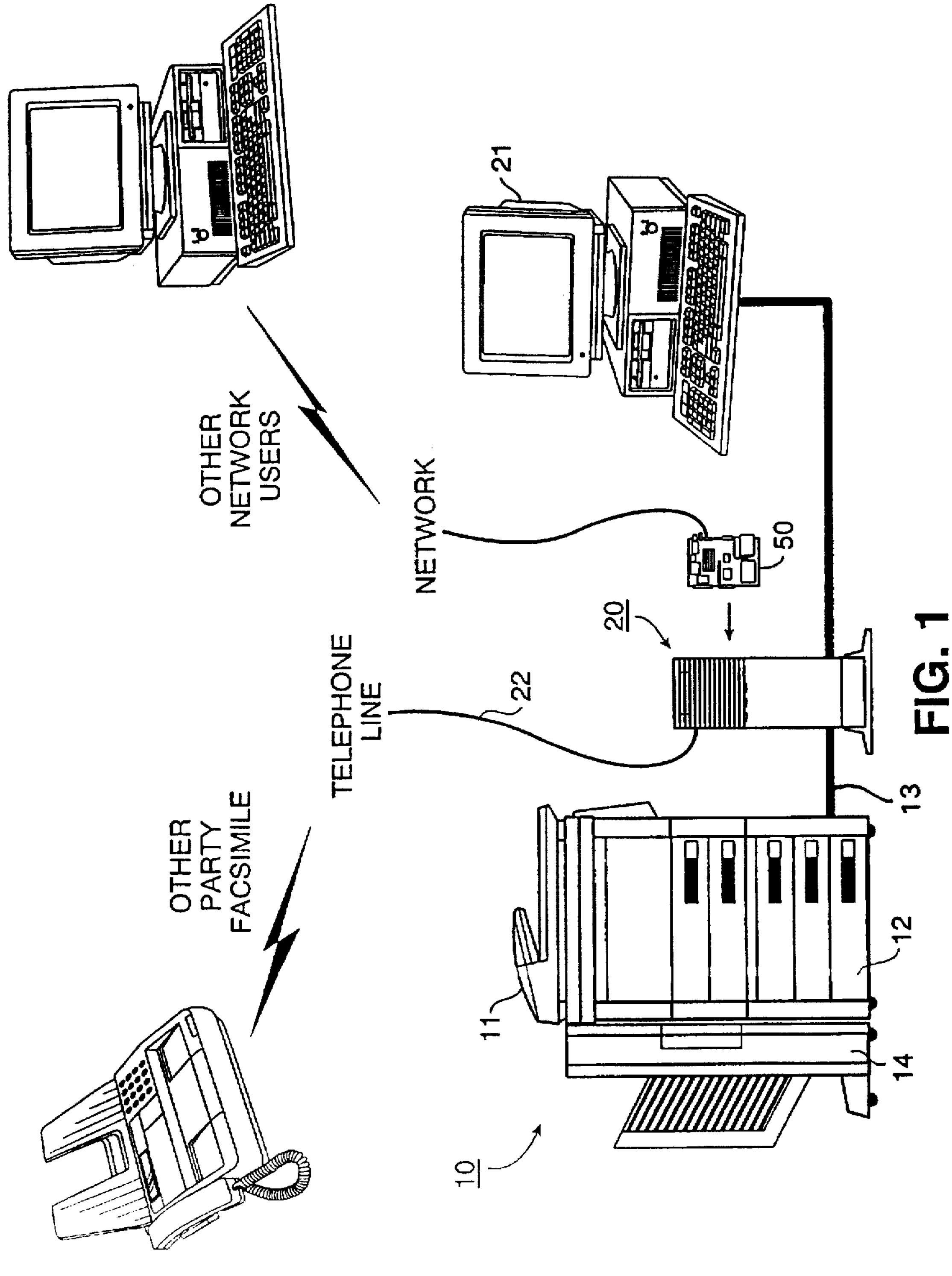
FIG. 1 is an overall system view of a network interface board installed in a multi-device controller (MDC) which includes a core board for controlling a digital copier.

FIG. 1 is an overall system view of a network interface board (hereinafter "NIB") 50 installed in a multi-device controller 20 which also controls a digital copier 10.

As seen in FIG. 1, a digital copier 10 includes a document feed section 11, a paper supply storage section 12 and a sorter/stacker 14. A suitable digital copier for use in the present invention is a Canon GP55F digital copier. As is known, such digital copiers operate to feed documents in document feed section 11 past a digital scanner so as to obtain a digital image of the scanned-in document. An unshown internal printer prints the scanned-in digital image onto paper supplied from paper storage section 12 and ejects the printed image to sorter/stacker 14.

A multi-device controller (hereinafter "MDC") 20 accesses an interface bus 13 of digital copier 10 so as to break out the functionality of the scanner section and the printer section. As described in more detail below with respect to FIGS. 2 and 3, MDC 20 includes a core board which accesses the interface bus of digital copier 10 and which provides access to that interface bus for plural option boards which are connectable to the core board. The option boards communicate with the core board via master/slave communication through dual port RAM on each option board. Most typically, one of the option boards will include an interface board so as to permit connection to MDC 20 by a stand-alone computer such as computer 21. Option boards may also include a facsimile board so as to permit connection to telephone 22, rasterizer boards so as to permit rasterization of page description language commands such as PCL5, LIPS, Postscript, and the like, and image processor boards which perform advanced image processing functions such as the block select and page analysis functions described in co-pending application Ser. No. 08/171,720, filed Dec. 22, 1993 "Method And Apparatus For Selecting Text And/Or Non-Text Blocks Stored In A Document".

Most notably, according to the present invention one of the option boards is a network interface board (NIB) 50 connectable to the core board in MDC 20 so as to permit access to a local area network.

In operation, digital copier 10 is operable in a stand-alone mode as a standard digital copier. In addition, it is operable as a scanner or as a printer to local users via personal computer 21. Most typically, via NIB 50, and in coordination with MDC 20, digital copier 10 is operable as a multi-functional network device accessible by any of multiple network users which may desire concurrent use of the scanner in copier 10, the printer in copier 10, or one of the option boards in MDC 20 such as the aforementioned facsimile option board, rasterizer option board, or image processing option board.

Figure 2:
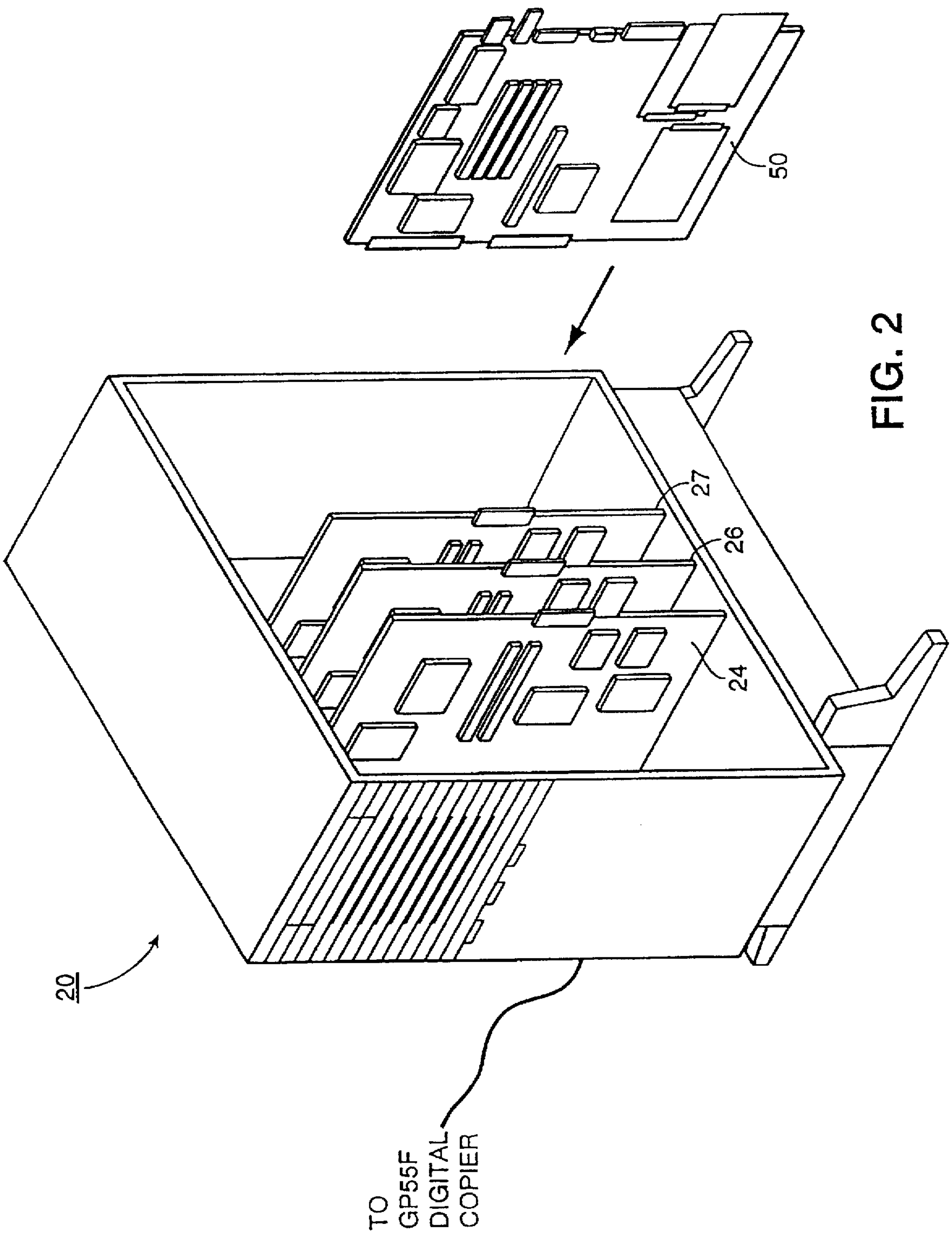
FIG. 2 is a cut away perspective view of the MDC for showing individual boards mounted therein.

FIG. 2 is a cut-away perspective view of MDC 20. As mentioned above, MDC 20 includes core board 24, interface board 26, option board 27 such as a facsimile or rasterizer or image processing option board, and NIB board 50.

Figure 3:
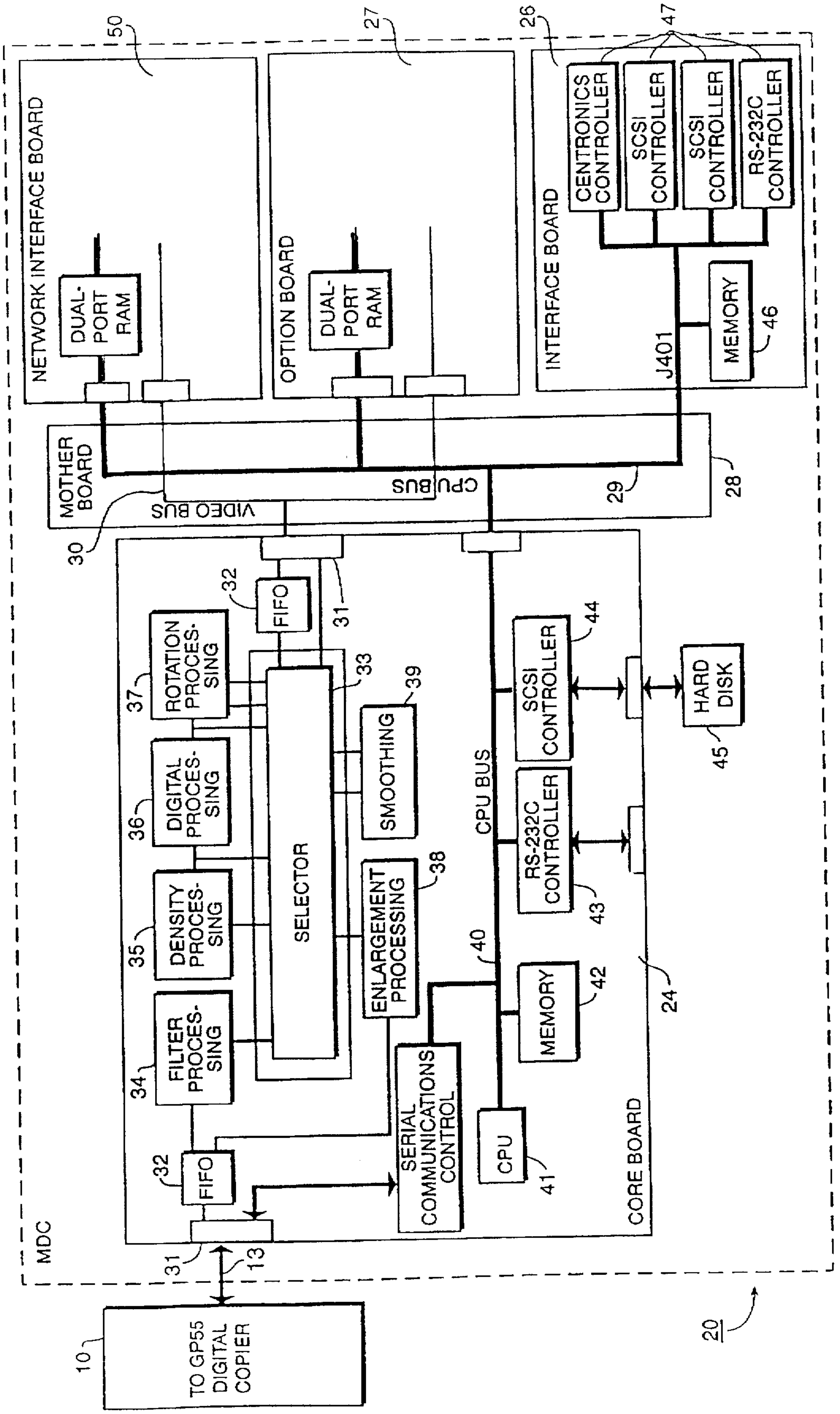
FIG. 3 is a functional block diagram of the MDC.
Figure 4A:
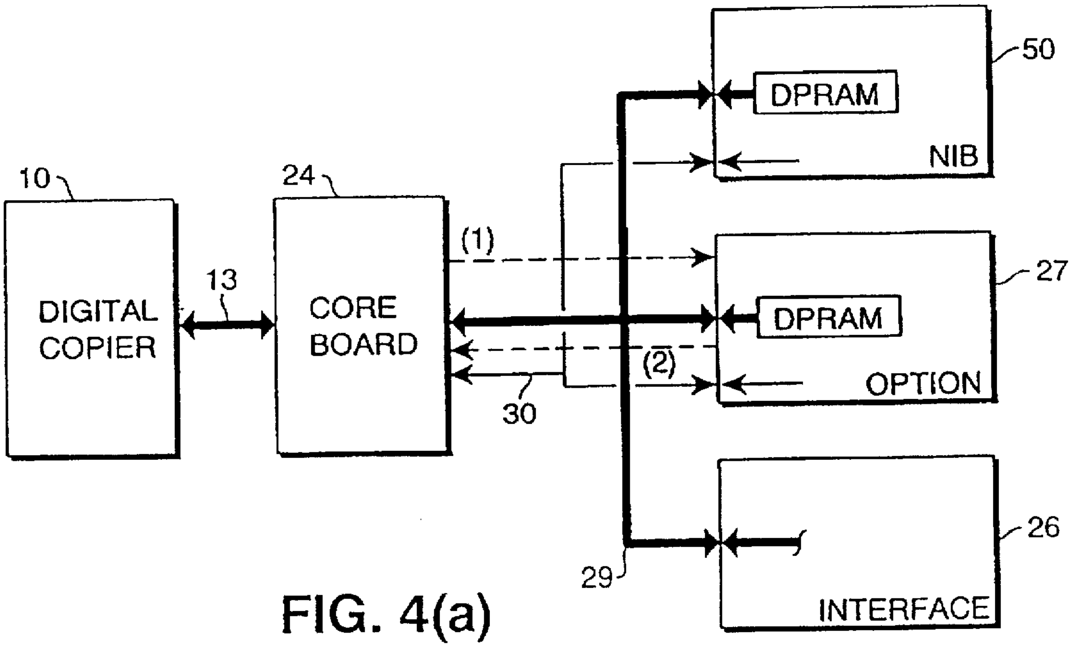
FIGS. 4(*a*) through 4(*d*) are views for explaining master/slave communication between the core board in the MDC and other boards in the MDC.
Figure 4B:
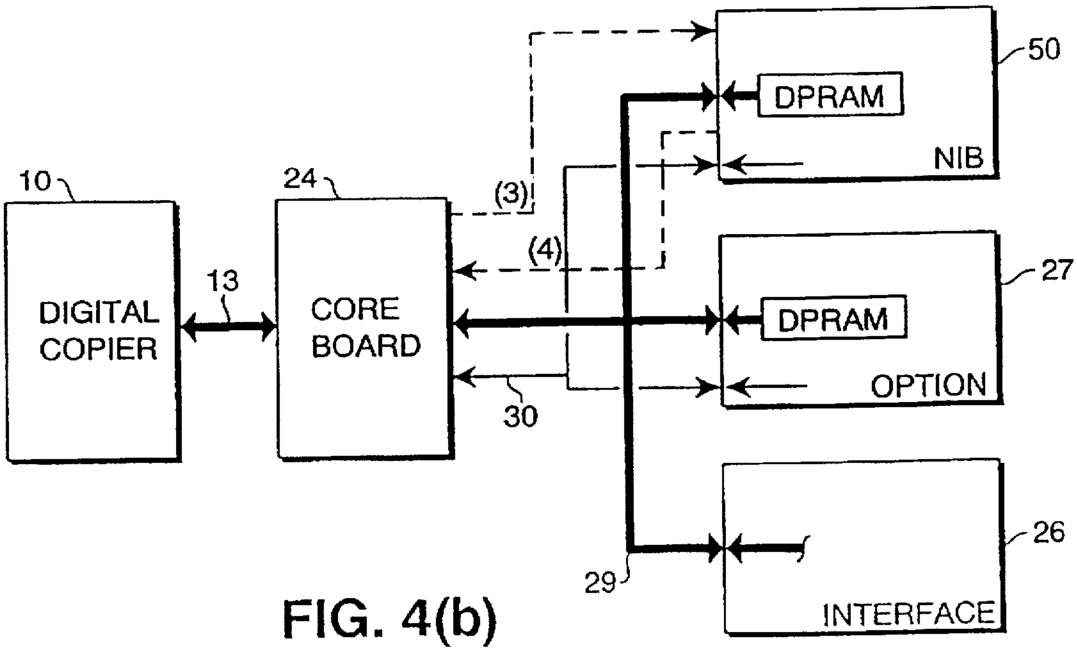
Figure 4C:
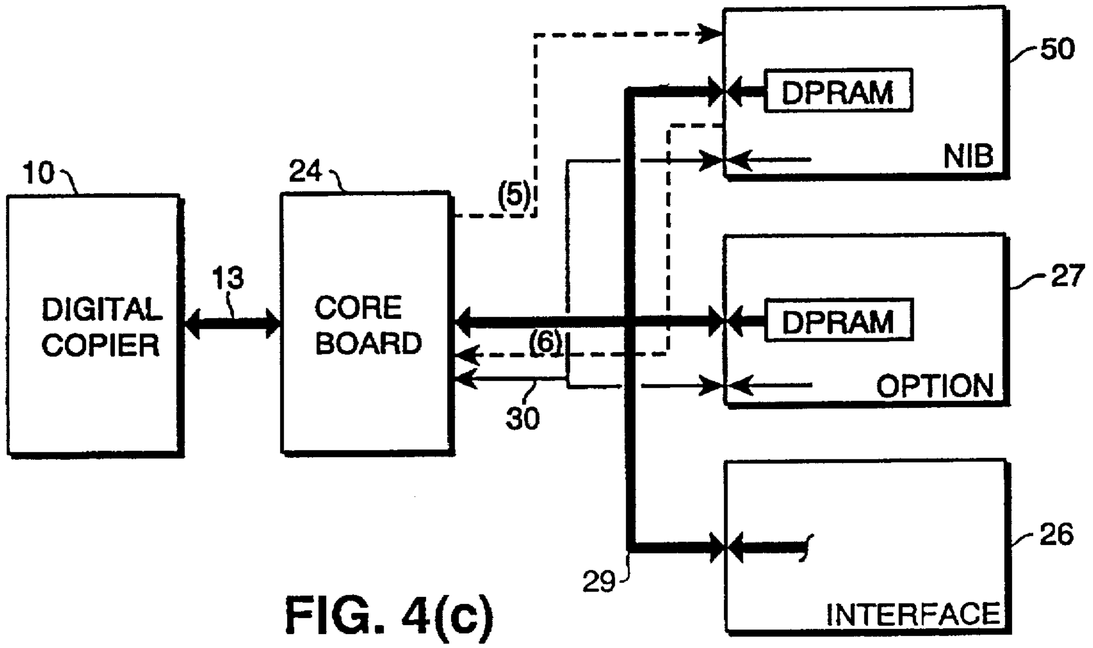
Figure 4D:
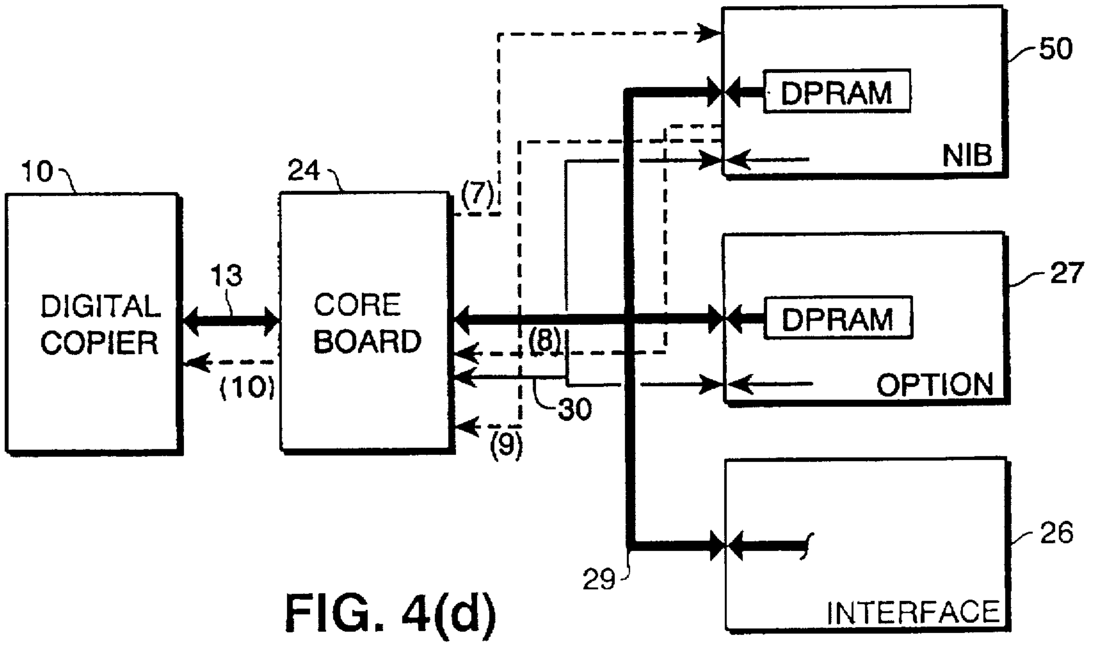

FIG. 3 is a block diagram of MDC 20. As shown in FIG. 3, core board 24, interface board 26, option board 27, and NIB board 50 are all connected to mother board 28 by CPU bus 29 and video bus 30. Core board 24 includes high speed processing circuitry so as to make interface bus 13 from digital copier 10 available on video bus 30. In particular, via connectors 31 and FIFO's 32, and under control of selector 33, core board 24 makes filter processing 34, density processing 35, digital processing 36, rotation processing 37, enlargement processing 38 and smoothing processing 39, available via video bus 30 to any of the connected option boards such as NIB board 50. Core board 24 also includes CPU 41 to control the interface board 26 and any connected option boards. CPU 41 is connected to CPU bus 40, to which are also connected RAM memory 42, RS-232 serial controller 43, and SCSI controller 44 which controls 40 MB hard disk 45. The core board controls all connected option boards using master/slave communications routed via a dual port RAM on each of the option boards. In such master/slave communications, which is described below in Section 1.1, the option boards return responses to access inquiry commands from the core board. Repetition of this process prevents collision during inter-board communications which are also permitted.

Interface board 26 is operated under direct control of CPU 41 via CPU bus 40 on core board 24 and CPU bus 29 on mother board 28. In particular, interface board 26 includes memory 46 as well as various controllers 47 for controlling parallel communications such as those with computer 21 via Centronix controller, SCSI communications via SCSI controller, and serial communications via RS-232 controller.

1.1 Master/Slave Communication

All communications in the MDC are relayed through core board 24. For example, reception or transmission of image data to interface bus 13 of digital copier 10 is relayed from or to option boards or the NIB board via core board 24. In addition, inter-board communication is relayed through the core board. For example, in a situation where option board 27 includes facsimile capability, a network user accesses that facsimile capability via NIB board 50 which relays communications to option board 27 through core board 24. This occurs through cyclic transmissions of access inquiry commands by core board 24 to the dual port RAM in each of the option boards. Each option board responds to its access inquiry command from core board 24 by issuing a response. The response may include a request for the core board to issue further commands to the option board, such as a command for the option board to transmit data to the core board or to put video data onto video bus 30. The core board reads the response from the dual port RAM of the option board and processes the response appropriately. For example, when transmitting facsimile data from a network via NIB board 50, when NIB board 50 reads its access inquiry command from core board 24 on the NIB's dual port RAM, it issues a response to the core board indicating that facsimile data is to be transmitted to an option board. Core board 24 would then issue a command for the NIB board 50 to output the facsimile data; the NIB board 50 responds to this command by writing the facsimile data to its dual port RAM. Core board 24 retrieves the facsimile data, and, in its next cycle, core board 24 issues an access inquiry command to the dual port RAM of facsimile option board 27, the access inquiry command including a command to receive data. In this way, core board 24 manages access of boards and devices by cyclically sending access inquiry commands to the boards and devices under its control, and by receiving responses.

Thus, all communications in the MDC, including communications to and from copier 10 over interface 13 and communications to and from option boards or NIB 50, are relayed through core board 24 by having core board 24 cycle through all its connected devices and cyclically issue each one an access inquiry command. Core board 24 expects a response from each option board and that response may include a request to issue further commands. In this way, core board 24 acts as a master device in master/slave communication with each attached device.

FIGS. 4(*a*) through 4(*d*) illustrate this master/slave communication process in the situation in which NIB 50 transmits a print job sequence to digital copier 10 relayed by core board 24. As shown in FIG. 4(*a*), core board 24 cycles through all option boards connected to it and at (1) issues an access inquiry command to option board 27. Option board 27 responds at (2) indicating that no access is needed.

Core board 24 continues on its cyclic accesses to devices connected to it by issuing an access inquiry command (3) to NIB 50. NIB 50, which has a print job ready for sending to digital copier 10, responds at (4) with a request to core board 24 to issue further commands so as to retrieve the print job from NIB 50.

As shown at FIG. 4(*c*), core board 24 issues a PCL data input command (5), to which NIB 50 responds at (6) by transmitting a count and PCL data. This sequence of core board 24 issuing commands to which NIB 50 responds continues until NIB 50 has transmitted to core board 24 all set up information (such as destination, page count, paper source, and the like) for the print job.

Then, as shown at FIG. 4(*d*), core board 24 issues a command (7) to NIB 50 to transfer image data. NIB 50 responds at (8) with an acknowledgement of the transmit command and also responds by transmitting image data at (9) on image bus 30. Core board 24 relays the image data at (10) onto digital copier 10 which, in turn, prints the job.

In like fashion, core board 24 relays communications to other devices connected thereto, for example, by relaying a scan job from digital copier 10 to NIB 50, or by relaying a facsimile job from NIB 50 to a facsimile option board 27.

2. Network Interface Board

Figure 5:
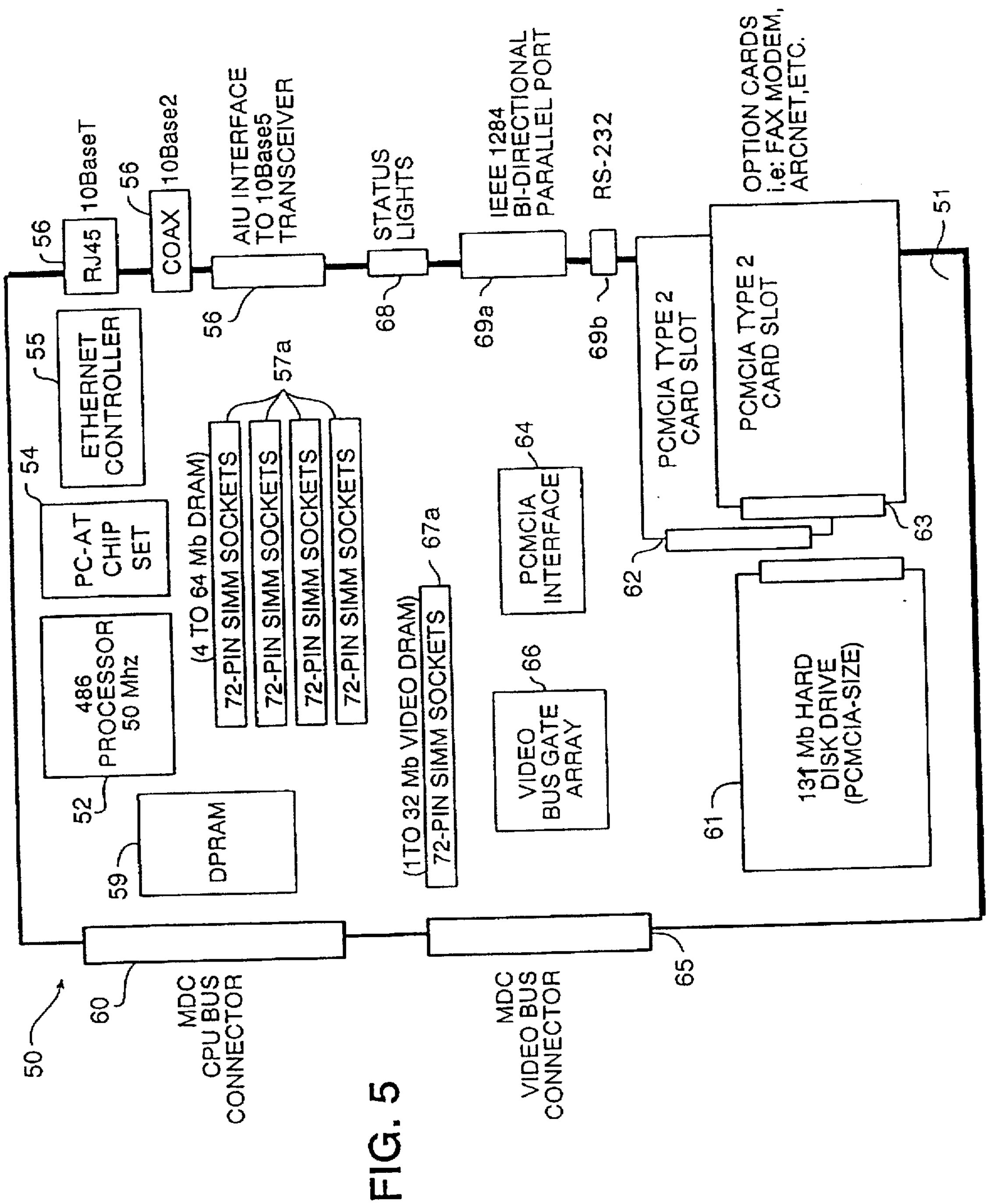
FIG. 5 is a view showing the physical layout of components on a network interface board.

FIG. 5 is a view showing the physical layout of components on network interface board 50. As shown in FIG. 5, NIB 50 includes, all mounted on PWB (printed wiring board) 51, a microprocessor 52 such as an Intel 80486-DX2 microprocessor for controlling all functions on NIB 50, a PC-AT chipset 54 which includes logic circuitry specific to the NIB for controlling and monitoring various functions on NIB 50 such as monitoring address and data buses and issuing chip select commands, a network controller 55 such as an Ethernet controller for managing access to the local area network, and three network connectors 56 for connecting to any of the standard network wiring such as 10 Base T, 10 Base 2 and AUI. Microprocessor 52 is provided with a minimum of 4 MB of dynamic RAM (DRAM) via SIMM sockets 57, which can accept up to 64 MB of DRAM. Dual port RAM 59 is provided to communicate with MDC core board 24 on MDC CPU bus 29 via connector 60.

Microprocessor 52 is also provided with access to a PCMCIA-sized hard disk drive 61 for persistent storage, in this case a 131 MB hard disk drive. Two option slots 62 and 63 respectively, which are controlled by PCMCIA interface controller 64 are provided for PCMCIA type 2 expansions by which it is possible to equip NIB 50 with a variety of additional peripherals such as a modem, an ArcNet interface, and the like.

Access to the MDC's video bus 30 is provided via video bus connector 65 which is controlled by video bus gate array 66. Gate array 66 has access to a minimum of 1 MB of video RAM (VRAM) which is expandable up to 32 MB of DRAM via SIMM socket 67.

Status lights 68 are provided for a user to monitor internal status flags of NIB 50. In addition, two data interface ports are provided: bi-directional parallel port 69*a* so as to permit connection to a bi-directional data device such as a standalone computer, and RS-232 serial port 69*b* so as to support serial communication such as for debug purposes.

2.1 Network Interface Board Structure

Figure 6:
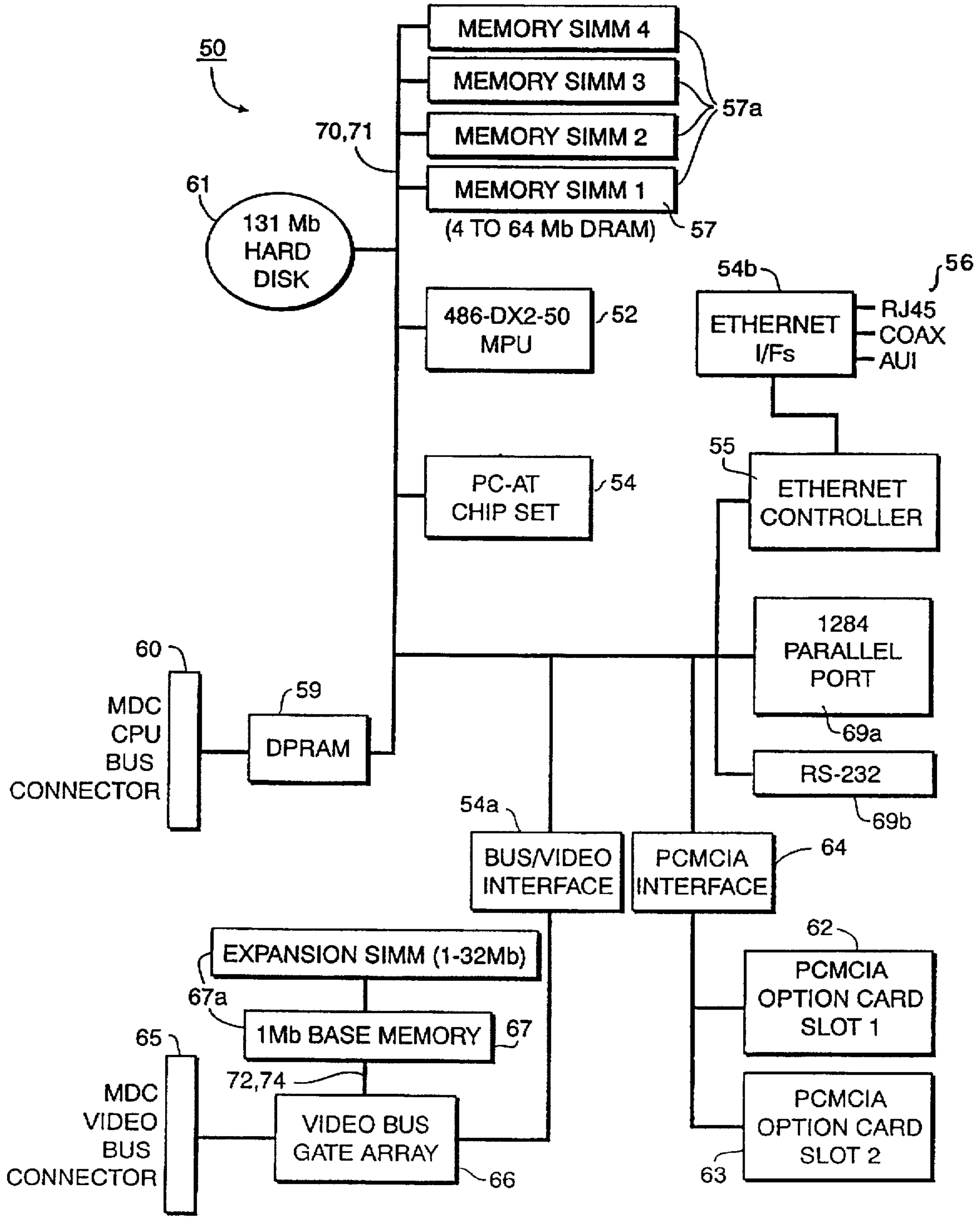
FIG. 6 is a block diagram of the network interface board.

FIG. 6 is a high-level block diagram showing interconnectivity on NIB 50. As seen there, microprocessor 52 is connected to address bus 70 and data bus 71. Chipset 54 is also connected to address and data buses 70 and 71. Chipset 54 includes an interface 54*a* between address and data buses 70 and 71 and video bus gate array 66, as well as an interface 54*b* between Ethernet controller 55 and network connectors 56. Address and data buses 70 and 71 also have connected to them the Ethernet controller 55, DRAM SIMM sockets 57*a* including 4 MB of DRAM 57, dual port RAM 59 which, as mentioned above, interfaces to MDC CPU bus 29 via connector 60, persistent memory 61, here a 131 MB hard disk drive, and PCMCIA interface 64 which interfaces slots 62 and 63 for PCMCIA option cards to address and data buses 70 and 71.

Interface 54*a* interfaces video bus gate array 66 to address and data buses 70 and 71. Video bus gate array 66 includes its own address and data buses 72 and 74 to which are connected memory SIMM sockets 67*a* including 1 MB of VRAM 67. As mentioned above, video bus gate array 66 interfaces to video bus 30 via connector 65.

Figure 7:
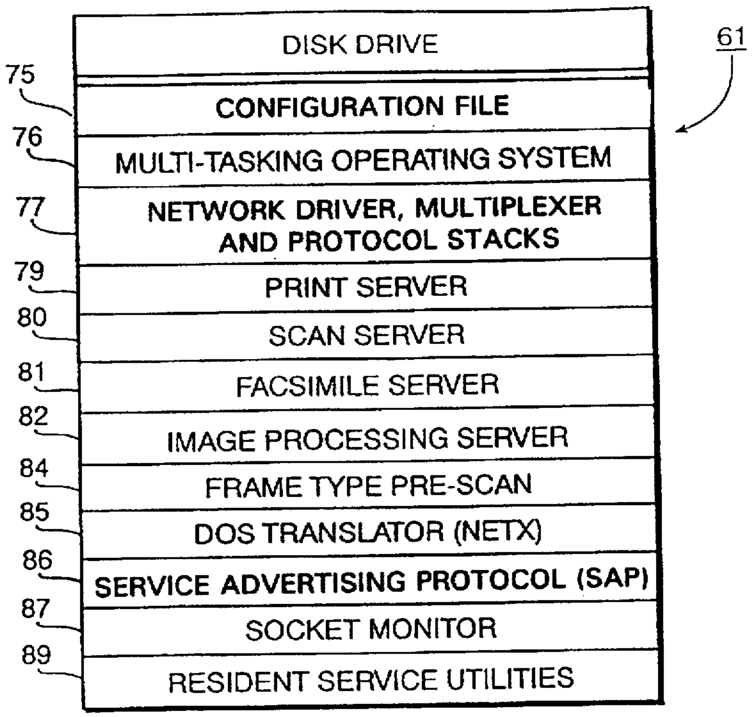
FIG. 7 is a view illustrating program steps stored in persistent storage on the network interface board.

FIG. 7 illustrates one possible arrangement of process steps (or, programs) which are stored in persistent memory on disk drive 61 for access and processing by microprocessor 52. As shown in FIG. 7, disk drive 61 includes a configuration file 75 which is processed by microprocessor 52 upon power on or receipt of a boot-up command. The configuration file ordinarily directs processor 52 as to how to partition memory, what memory-resident programs to be loaded into which areas of memory, what application programs to be started as concurrently executed tasks, and the like. For example, configuration file 75 may include instructions to microprocessor 52 to dedicate certain areas of DRAM 57 for network communication protocol.

Also included in disk drive 61 is a multi-tasking operating system 76 which permits microprocessor 52 to operate in a multi-tasking environment whereby network processing is executed concurrently for different network users. More particularly, because of multi-tasking operating system 76, microprocessor 52 is capable of processing network requests from a first network user, such as a request for print services, concurrently with processing of network requests from a second user, such as a request for scan services, without the need to wait until processings for the first network user are complete.

The kernel of the multi-tasking operation system 76 allows for task management, inter-task communication, memory management and certain other kinds of resource management. Specifically, the kernel will provide the following:

(1) Multi-tasking: The kernel supports non-preemptive multi-tasking for cooperating 16-bit applications which will execute in V86 mode, and for cooperating 32-bit applications which will execute in protected mode. In addition, the kernel will preemptively multi-task non-cooperating off-the-shelf DOS applications by executing them in the V86 mode of microprocessor 52. (V86 mode allows real mode executables to be located anywhere in the physical address space and is not restricted to the lower 1 MB of physical memory as real mode would be.)

(2) DOS Support: The kernel allows multiple DOS tasks to execute. These tasks execute in V86 mode, each in its own "virtual machine". The level of DOS support that is provided includes support for the DOS file system but typically would not include support for video, keyboard or mouse devices. Preferably, DOS itself is not implemented inside the kernel; rather the kernel allows DOS to be shared among different DOS tasks.

(3) Inter-task Communication: A messaging mechanism is provided for inter-task communication. An API that provides IPC will exist; although this may be implemented outside the kernel.

(4) Shared Libraries: This kernel allows for libraries to be shared among different tasks such that only a single copy of a library routine exists regardless of the number of tasks.

(5) Memory Management: Interfaces to allocate and free memory are provided. This makes it possible to support applications that require access to greater than 1 MB of memory. These applications can be developed as 32-bit DOS applications, although a DOS extender will be required to provide DOS services to the 32-bit application. The kernel implements DPMI thus allowing any DPMI compatible DOS extender to be used to provide the 32-bit access.

(6) Interrupt Handlers: DOS style device drivers are supported.

(7) Flat Addressing Model: The kernel supports a flat 32-bit addressing model of the Intel 80486.

(8) Host PC Support: The kernel will run on a 80486/80386 equipped PC work station. Thus a work station can be used as both a development environment and as a (limited) test environment for NIB application software, using standard off-the-shelf DOS PC tools.

Disk 61 further includes a network driver and multiplexer software as well as network protocol stack modules including IPX/SPX which is a Novell-type protocol stack and TCP/IP which is a UNIX-type protocol stack.

Particularly, MLID (multi-link interface driver) comprises the lowest level of network connection software and includes MSM (media support module) linked together with HSM (hardware support module). LSL (link support layer) is network code that acts as a multiplexer between the lowest level MLID functionality and network protocol stacks above. Those protocol stacks include IPX/SPX protocol stacks, which is a Novell-type protocol stack, as well as a TCP/IP protocol stack which is a UNIX-based protocol stack.

Disk 61 also includes print server processing step 79 and scan server processing steps 80. The print server and scan server export functionality of the printer and scanner in digital copier 10 onto the local area network. More particularly, in response to network requests for print or scan services, print server 79 and scan server 80 function to service those requests by master/slave communication to core board 24 via CPU bus 29 and connector 60, and to read and to write video information on video bus 30 via connector 65. Moreover, by virtue of multi-tasking operating system 76, print server functionality and scan server functionality may be carried out concurrently without waiting for one service to be completed before the other begins.

Disk 61 may include other servers such as facsimile server 81 and image processing server 82. Those other servers operate to export functionality of other option boards 27 connected to MDC 20. For example, in a case where a facsimile option board is connected to MDC 20, facsimile server 81 exports the functionality of the facsimile option board onto the local area network. As another example, in a case where a special-purpose image processing board, such as an image processing board with performs block selection in accordance with the aforementioned Ser. No. 08/171,720, is connected to MDC 20, then image processing server 82 operates to export the functionality of that special-purpose board onto the local area network. Moreover, as mentioned above, because of multi-tasking operating system 76, that functionality is exported in a multi-tasking environment whereby all needed servers process data concurrently without the need to wait for completion of a previous network request.

Other programs stored on disk 61 include a frame-type pre-scanning program 84 which is responsible for identifying what frame types (such as 802.2, 802.3, Ethernet_II or Ethernet_snap) are associated with what protocol stack (for example, IPX/SPX or TCP/IP). Suitable pre-scan operations are described in co-pending application Ser. No. 08/336,062, filed Nov. 4, 1994, entitled "Network Protocol Sensor".

DOS translator 85 includes codes that translates local DOS-like function calls into network function calls. DOS translator 85 thereby provides network file functions, such as open, read, write and close. Service advertising protocol 86 is a common Novel operating system concept which allows network devices to register themselves with the network's file server. The file server maintains lists of active and inactive network entities such as print servers, scan servers, facsimile servers and the like. A socket monitor 87 is included so as to provide NIB-internal coordination of all protocol stacks. Socket monitor 87 typically owns the status and control channel between the network board and the MDC and, for this reason, is the only task that has the ability to get printer status. Socket monitor 87 provides status and control to other tasks via inter-process communication internal to the NIB. Socket monitor 87 is also responsible for network connection and packet contents between all Novel-oriented status and control utilities. Finally, resident services utilities 89 include a variety of utilities which provide generic services such as non-volatile RAM read and write, a debugger, timer clicks, and other basic features.

Figure 8:
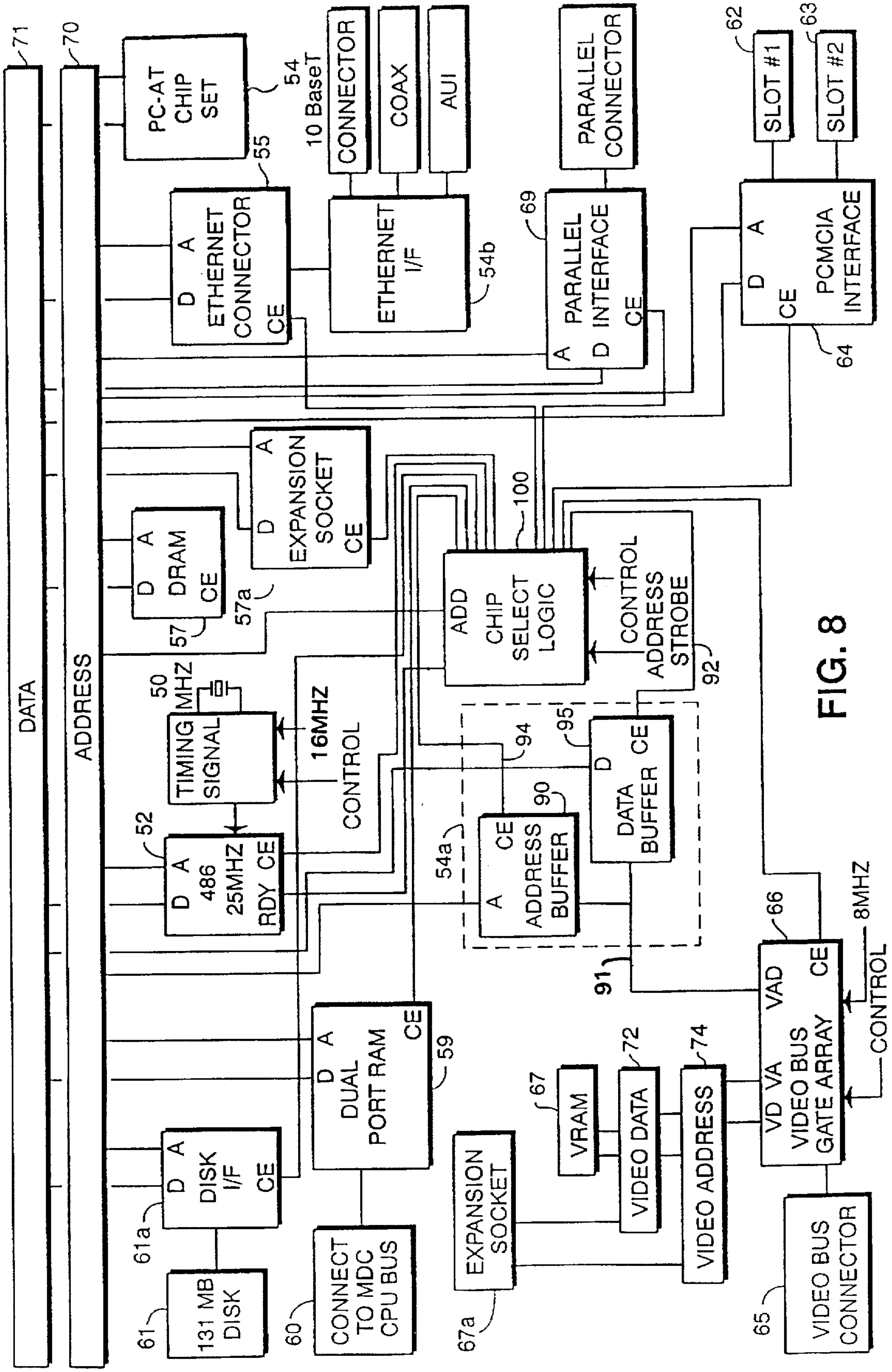
FIG. 8 is a detailed block diagram of the network interface board.

FIG. 8 is a detailed block diagram showing connection of the components shown in FIG. 6 to address bus 70 and data bus 71. As shown in FIG. 8, microprocessor 52 is connected directly to both address and data buses 70 and 71. Also connected directly to address and data buses 70 and 71 are PC-AT chipset 54, Ethernet controller 55, DRAM 57 and expansion slots 57*a*, dual port RAM 59, disk interface 61*a* for persistent storage 61, PCMCIA interface 64, and parallel interface 69. Video bus gate array 66 is indirectly connected to address and data buses 70 and 71 through address buffer 90 and data buffer 95. Address buffer 90 and data buffer 95 define a combined video-address-data bus 91 which is provided to video bus gate array 66. As mentioned above, video bus gate array 66 includes its own video address and data buses 74 and 72 through which gate array 66 addresses video RAM 67 and any RAM inserted into expansion slot 67*a*.

Each of the devices connected directly or indirectly to data or address bus 70 or 71 (i.e., Ethernet controller 55, DRAM 57, dual port RAM 59, disk interface 61*a*, PCMCIA interface 64, parallel interface 69, address buffer 90, data buffer 95 and video bus gate array 66) includes a chip enable input. Unless the chip enable input is active, the device ignores traffic on the address and data buses, and is prohibited from writing onto the address or data buses. Chip select logic 100 is responsible for determining which of the various devices connected directly to address and data buses 70 and 71 should be permitted to read or write data to those buses. More particularly, chip select logic 100 coordinates bus activity so as to arbitrate bus contention situations. It does so by monitoring address signals appearing on address bus 70 and by decoding those address signals so as to determine which device is being addressed. After decoding the address signals, chip select logic 100 issues one of plural chip select signals which is received at the chip enable input of the designated device.

2.2 Chip Select Logic

Figure 9A:
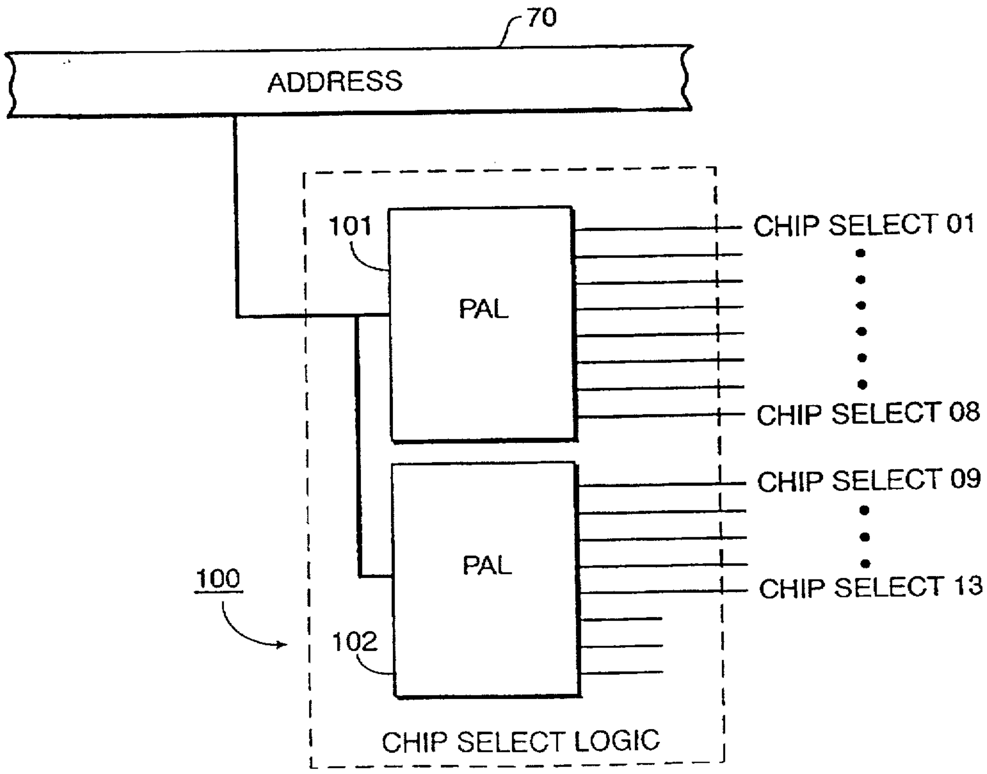
FIG. 9(*a*) is an example of conventional 8-chip select logic.
Figure 9B:
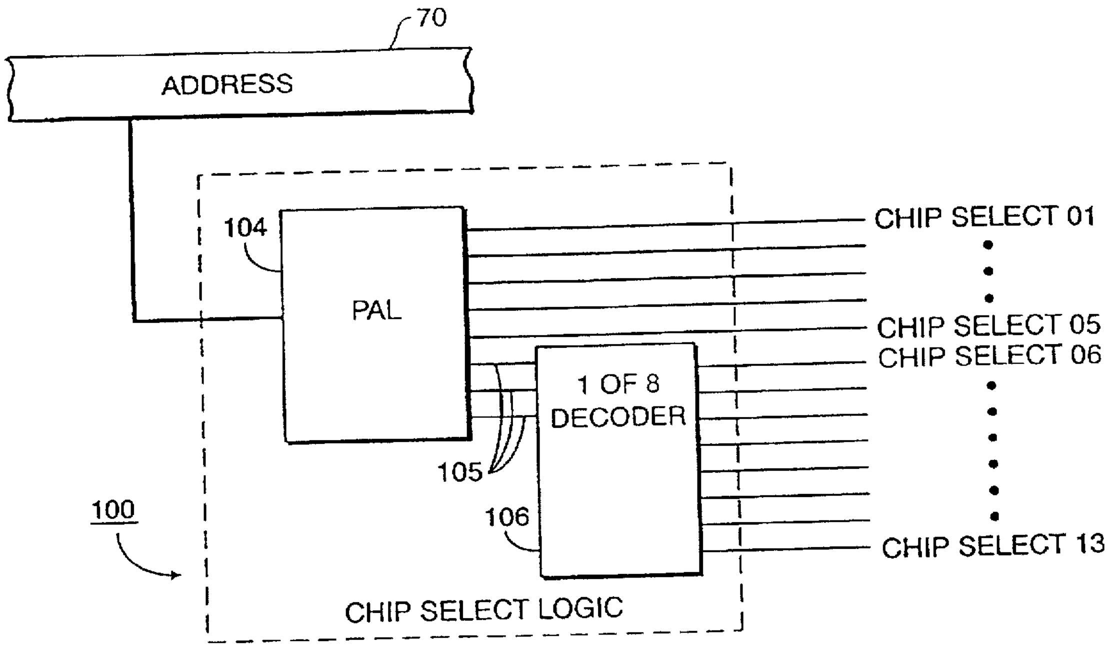
Figure 9C:
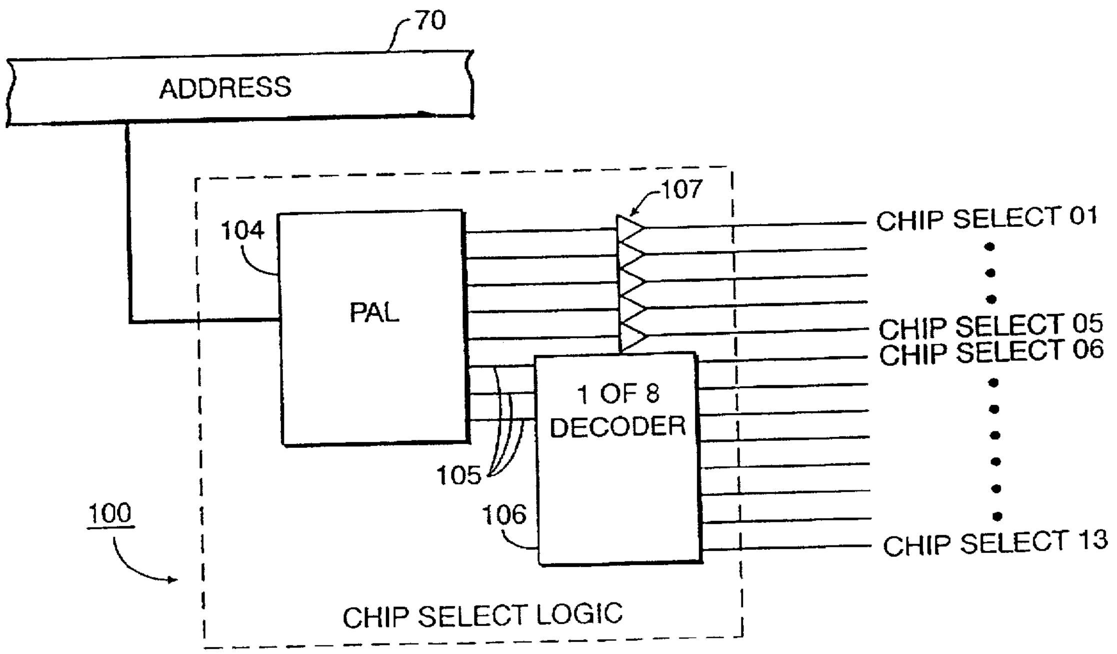

FIGS. 9(*a*) through 9(*c*) show possible implementations of chip select logic 100. These implementations use a conventional programmable array logic (PAL) which can be programmed as desired to decode addresses on address bus 70 so as to output one or more signals in response to the decoded address.

FIG. 9(*a*) shows conventional chip select logic. As shown in FIG. 9(*a*), two PALs 101 and 102 decode address signals on address bus 70 so as to output exactly one of plural chip select signals 01 through 13. Particularly, conventional PAL chips ordinarily include only eight outputs. Consequently, because of the large number of devices connected to address and data buses 70 and 71, two such PALs are needed so as to provide the needed number of chip select signals. This implementation is not cost effective because two fairly expensive PALs must be provided.

FIG. 9(*b*) shows an alternative implementation of chip select logic 100 which only requires use of a single PAL. More particularly, the arrangement shown in FIG. 9(*b*) includes a PAL which outputs not only chip enable signals but which also outputs coded signals which are decoded by a separate decoder so as to output the needed chip select signals. This arrangement is advantageous because it does not require use of a second PAL but rather only requires use of an inexpensive decoder such as a standard one-of-eight binary decoder.

More particularly, as shown in FIG. 9(*b*), chip select logic 100 includes PAL 104 which is programmed so as to accept address signals from address bus 70 and to output at least one of chip select signals 01 through 05. PAL 104 is also programmed to output coded signals 105, here three binary coded signals. The coded signals are not chip select signals directly, but rather are encoded chip select signals for chip select numbers 06 through 13, as shown in the following table:

TABLE

| CODED SIGNALS | CHIP SELECT |
|---|---|
| 000 | 06 |
| 001 | 07 |
| 010 | 08 |
| 011 | 09 |
| 100 | 10 |
| 101 | 11 |
| 110 | 12 |
| 111 | 13 |

Decoder 106, which is a conventional one-of-eight binary decoder, accepts coded signals 105 and decodes them into the needed chip select signals, i.e., chip select signals 06 through 13.

If desired, the arrangement shown in FIG. 9(*c*) can also be used. FIG. 9(*c*) differs from FIG. 9(*b*) by the addition of buffers 107 to the chip select outputs from PAL 104. Buffers 107 compensate for the slight additional delay introduced by decoder 106 and make chip select signals 01 through 13 all valid at the same time.

2.3 Video Bus Communication

Video bus gate array 66 coordinates all accesses to video RAM (VRAM) 67. Specifically, video bus gate array 66 permits core board 24 to read and write video data into VRAM 67 via video bus 30, and it permits microprocessor 52 to read and write video data into VRAM 67 via address and data buses 70 and 71. Video bus gate array 66 provides proper arbitration services to ensure that only one of core board 24 and microprocessor 52 has access to VRAM at any one time.

Video bus gate array 66 has a 16 bit wide data path and operates under 16 MHz clocking provided by PC-At chipset 54 when it is being accessed by microprocessor 52. Since data transfer between core board 24 and VRAM 67 occur over the video bus 30, no special processing need be performed when accesses to VRAM 66 are made via the video bus. Those accesses, both reads and writes, proceed as described above in Section 1.1.

On the other hand, the 16-bit format of video bus gate array 66 does not match the 32-bit format of microprocessor 52, and the 16 MHz clocking rate does not match the 25 MHz rate of microprocessor 52. More particularly, the microprocessor used here (an Intel 486 microprocessor) is a 32-bit microprocessor which accesses 32-bit bytes in DRAM 57 and dual port RAM 59. In order to permit access to 16-bit, 16 MHz video gate array 66 by 32-bit, 25 MHz microprocessor 52, special interfaces are needed. Interface 54*a* implements the needed arbitration, timing, synchronization, and bus signal alignment, between VRAM 67, video bus gate array 66, and microprocessor 52.

Interface 54*a* includes address buffer 90 and data buffer 95. Address buffer 90 is connected between address bus 70 and address/data bus 91 which, in turn, is fed to video bus gate array 66. Address buffer 90 is responsive to chip selection signal 94 from chip select logic 100 such that, in response to activation of selection signal 94, address buffer 90 buffers address information on address bus 70 onto address/data bus 91.

Data buffer 95 is connected between data bus 71 and address/data bus 91. Data buffer 95 is responsive to a data buffer selection signal 92 such that, in response to activation of selection signal 92, data buffer 95 buffers data information on data bus 91 from or to (in accordance with whether a read or a write is desired) address/data bus 91.

Timing of address buffer selection signal and data buffer selection signal 92 is coordinated by chip select logic 100 such that in response to address information on address bus 70 which corresponds to addresses of video gate array 66, chip select logic 100 activates the address buffer selection signal 94 so as to cause the address buffer to buffer address information from the address bus 70 onto the address/data bus 91. Thereafter, the address buffer selection signal 94 is deactivated and data buffer selection signal 92 is activated so as to cause data buffer 95 to buffer data information on data bus 71 from or to address/data bus 91. Chip select logic 100 also activates a not-ready signal 96 which it sends to microprocessor 52 so as to cause microprocessor 52 to insert wait states, as needed, during read and write operations to video gate array 66.

Figure 10:
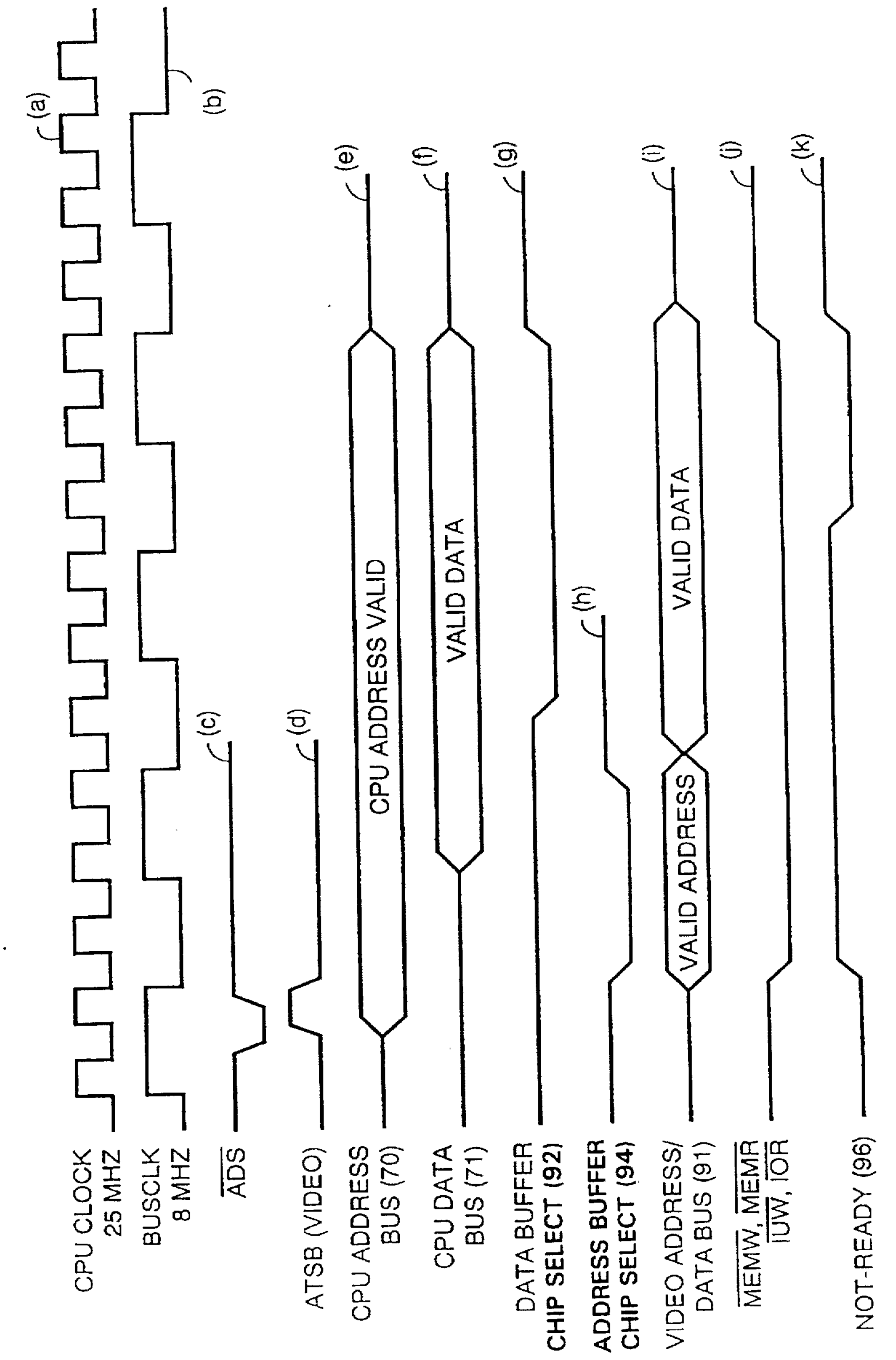
FIG. 10 is a timing diagram for explaining an interface for shared RAM.

FIG. 10 is a timing diagram showing operation as described above. In FIG. 10, a is a microprocessor clock signal which, in this embodiment, is 25 MHz, b is a bus clock signal which controls video bus operations for video bus gate array 66 and which is obtained by dividing clock signal a down to 16 MHz, c is a strobe signal indicating a strobe on address/data bus 91, d is a video strobe signal, e is a representative view of address information on address bus 70, f is a representative view of data information on data bus 71, g shows the state of data buffer selection signal 92, h shows the state of address buffer selection signal 94, i shows a representative view of address information and data information on address/data bus 91, j is a read/write signal, and k shows the state of not-ready signal 96 which is fed to microprocessor 52.

As shown in FIG. 10, when address information on address buffer 70 corresponds to a memory location in VRAM 67, and in response to receipt of address strobe d, chip select logic 100 generates three signals: an address buffer selection signal 94, a not-ready signal 96, and a chip selection signal for video bus gate array 66. Not-ready signal 96 causes microprocessor 52 to generate wait states during the ensuing memory access operations. Meanwhile, address buffer selection signal 94 causes address buffer 90 to buffer address information on address bus 70 onto address/data bus 91.

In response to valid address information on address/data bus 91, and when its chip selection signal has been activated by chip select logic 100, video bus gate array 66 accesses VRAM 67 via video data bus 72 and video address bus 74. In the case of a read from VRAM 67, video bus gate array 66 provides data from VRAM 67 back onto address/data bus 91. In the case of a write to VRAM 67, video bus 66 waits for valid data information to appear onto address/data bus 91 which it thereafter writes to VRAM 67, as described below.

After a clock cycle has passed, chip select logic 100 deactivates address buffer selection signal 94 and activates data buffer selection signal 92, which, in turn, causes data buffer 95 to buffer data information on data bus 71 from or to (depending on whether a read or write is requested) address/data bus 91. Particularly, in a case of a write to VRAM 67, data information on data bus 71 is buffered by data buffer 95 onto address/data bus 91 where video bus gate array 66 provides it to VRAM 67 via video data bus 72. In the case of a read from VRAM 67, video bus gate array 66 retrieves data in VRAM 67 via video data bus 72 and puts the data onto address/data bus 91, as described above, where data buffer 95 buffers that data back onto data bus 71.

After data buffer selection signal 92 has been active for at least one complete clock signal, not-ready signal 96 is deactivated signalling microprocessor 52 that the current VRAM access cycle is complete. If microprocessor 52 had been writing to VRAM 67, that operation is now complete; likewise, if microprocessor 52 had been reading from VRAM 67, microprocessor 52 can now obtain the requested data information from data bus 71.

3. Operation

Operation of the network interface board will now be explained with reference to the flow diagram shown in FIG. 11. The process steps shown in FIG. 11 are executed by microprocessor 52 by loading the process steps 61 (FIG. 7) into DRAM 57 and executing the process steps from DRAM.

Figure 11:
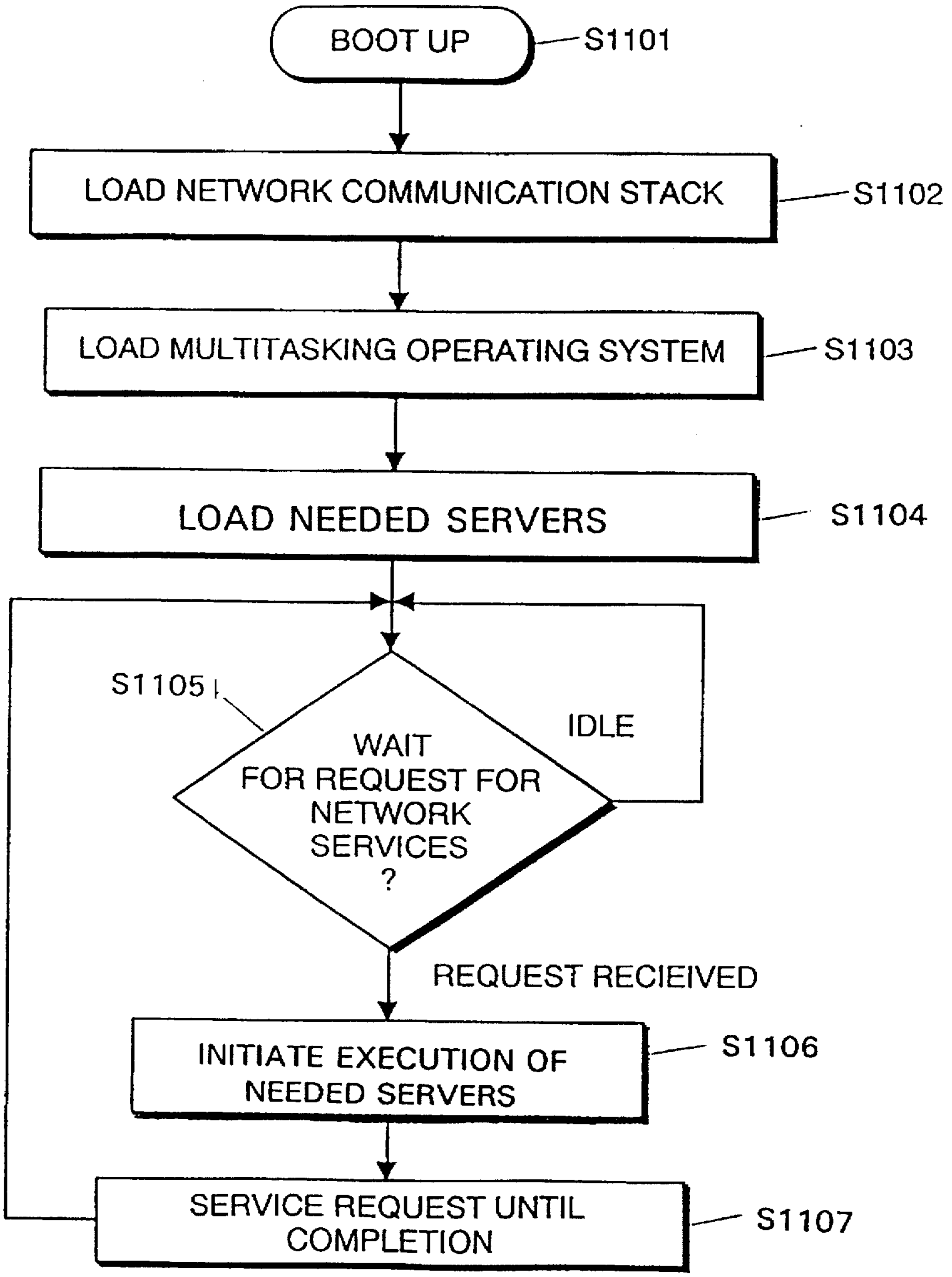
FIG. 11 is a flow diagram for explaining multi-tasking operation of the network interface board.

The process steps in FIG. 11 illustrate operation of a network interface board in a copier system having an interface bus connected to multi-device controller 20, the multi-device controller 20 having a core board 24 to which plural other boards are connected via video bus 29 and CPU bus 30. As described above, multi-device controller 20 controls each of the boards connected thereto by master/slave communication routed via CPU bus 29. Operation of NIB 50 in the manner described below exports scanning and printing functionalities of the copier, using image data transmitted via video bus 30, to a computerized local area network. In particular, as described in more detail below, through the network interface 56, requests for network services from the LAN are issued and responded to, and through MDC connectors 60 and 65 NIB 50 interfaces to the video bus and the CPU bus. Processor 52 operates in a multitasking environment to respond to master/slave access inquiry commands over the CPU bus from core board 24, and to read and write image data onto the video bus. The multitasking processor also responds to LAN requests for scanning and printing services and concurrently processes those scanning and printing requests. Other services may also be provided via NIB 50 in accordance with what other option boards are connected to MDC 20.

In step S1101, upon application of power or suitable logic reset, CPU 52 initiates boot-up processing by reference to configuration file 75 in disk drive 61. The configuration file, as mentioned above, can include various options fixing the configuration of NIB 50, such as memory allocation, operating system, etc. Ordinarily, configuration file 75 configures NIB 50 as a network interface board interfacing between the network and MDC 20. In that instance, configuration file 75, as mentioned above, includes configuration of memory, allocation of memory space for various memory-resident programs such as a network communication stack, and initiation and loading of multi-tasking operating system 76. Specifically, and as mentioned above, operation in multi-tasking operating system 76 permits concurrent network services for a variety of network users.

Reverting to FIG. 11, in step S1102, microprocessor 52 loads its network communication software. Specifically, microprocessor 52 loads the network driver and multiplexer into memory allocated for them (typically high memory), and in addition loads whatever network communication stacks are needed for participating in network communications in the network environment that NIB 50 is installed in. For example, in a situation where a Novell Netware network environment has been established, microprocessor 52 would load an IPX/SPX network communication stack into memory. Likewise, in a situation where a UNIX network operating system is in place, microprocessor 52 would load a TCP/IP network communication stack into memory. Whether to load IPX/SPX or TCP/IP, or both, is stored as part of start-up script 75.

In steps S1103 and S1104, multitasking operating system 76 and the needed network servers (such as print server 79, scan server 80, facsimile server 81, and/or image processing server 82) are all loaded, whereupon execution of multitasking operating system 76 is initiated. Then, in step S1105, NIB 50 waits for a request for network services. Until a request for network services is received, 50 stands by in an idle state, responding to access inquiry commands from core board 24 with simple acknowledgement ("ACK"). On the other hand, as soon as a request for network services is received, either from the network or from a local user such as a user operating digital copier 10, flow advances to step S1106.

In steps S1106 and S1107, after a request for network services has been received, the request is serviced. In particular, in step S1106, microprocessor 52 initiates execution of the appropriate network server. For example, in a situation where a request for print services is requested, microprocessor 52 initiates execution of print server 79. Likewise, in a case where scan services are requested, microprocessor 52 initiates execution of server 80. Facsimile server 81 and image processing server 82 are provided in situations where facsimile services or image processing services are requested.

In step S1107, microprocessor 52 continues execution of the needed server so as to service the request. Then, because of multitasking operation provided by operating system 76, flow also returns to step S1105 to wait for additional requests for network services. Meanwhile, services already being processed in step S1107 continue until they are complete. Should additional requests be received, then, in accordance with multitasking operation, microprocessor 52 initiates execution of the appropriate server (step S1106) and begins servicing the request (step S1107). Concurrent network processings, to the extent physically supported by devices controlled by NIB 50, are then carried out.

The invention has been described with respect to a particular illustrative embodiment. It is to be understood that the invention is not limited to the above described embodiment and that various changes and modifications may be made by those of ordinary skill in the art without departing from the spirit and scope of the invention.

What is claimed is:

1. In a copier having an interface bus connected to a core board, the core board being connected to plural boards via a video bus and a CPU bus, the core board controlling each of the boards connected thereto by master/slave communication routed via the CPU bus; the improvement including a network interface board for exporting scanning and printing functionality of the copier to a computerized local area network, the network interface board comprising:

a network interface for issuing and responding to requests for network services on the local area network;

a video bus interface for interfacing to the video bus, over which video data is transmitted between the core board and the network interface board;

a CPU bus interface for interfacing to the CPU bus, over which commands, requests and access inquiries are transmitted between the core board and the network interface board to effect the master/slave communication; and a multitasking processor for responding to local area network requests for scanning and printing services and for concurrently processing those scanning and printing requests by reading and writing video data to the video bus, the multitasking processor effecting the master/slave communication over the CPU bus so as to read and write the video data to the video bus, the master/slave communication comprising receiving an access inquiry from the core board over the CPU bus, responding to the access inquiry by issuing requests over the CPU bus to the core board to issue further commands including commands to read or write video data over the video bus, and reading or writing the video data on the video bus in response to commands received from the core board.

2. A network interface board according to claim 1, further comprising a persistent memory for storing thereon a multitasking operating system, and network communication software, a print server and a scan server, wherein said multitasking processor operates in accordance with said multitasking operating system so as to process network communications via the network communication software and so as to process requests for print services in accordance with the print server and for processing requests for scan services in accordance with the scan server.

3. A network interface board according to claim 2, wherein said persistent memory also stores at least one additional server, and wherein said multitasking processor concurrently processes requests for services of said peripheral server concurrently with other servers, and wherein said core board has connected thereto a peripheral board whose functionality is exported to the local area network via the additional peripheral server on said persistent memory.

4. A network interface board according to claim 3, wherein said network interface board communicates to said peripheral board via master/slave communication coordinated by said core board over the CPU bus.

5. A network interface board according to claim 3, wherein said additional peripheral board is comprised by a facsimile board and wherein said peripheral server is a facsimile server.

6. A network interface board according to claim 3, wherein said additional peripheral board is comprised by an image processing board and wherein said peripheral server is a image processing server.

7. A network interface board according to claim 1, wherein said network interface board includes dynamic random access memory exceeding 1 MB in capacity.

8. A network interface board according to claim 1, wherein said core board, in response to receipt of a request from the network interface board for a command to write video data, issues a command to said network interface board to write the video data onto the video bus.

9. A network interface board according to claim 8, wherein in response to receipt of a command to write video data onto the video bus, said network interface board writes video data onto the video bus.

10. A networkable digital copier which includes a scanner part and a printer part, said copier comprising:

an interface bus by which image data for the scanner part and the printer part is accessible;

a multi-device controller connected to said interface bus, said multi-device controller providing interface to the scanner part and the printer part via a core board, said multi-device controller also providing an interface to additional option boards via an MDC bus and a video bus connected to the interface bus; and a network interface board connected on one end to the MDC bus and to the video bus and connected on another end to a local area network, the network interface board including a multi-tasking processor which provides multiple network users with concurrent and independent access to each of the scanner part and the printer part;

wherein the multitasking processor effects master/slave communication over the MDC bus so as to read and write image data to the video bus, the master/slave communication comprising receiving an access inquiry from the core board over the MDC bus, responding to the access inquiry by issuing requests over the MDC bus to the core board to issue further commands including commands to read or write image data over the video bus, and reading or writing the image data on the video bus in response to commands received from the core board.

11. A networkable digital copier according to claim 10, wherein said network interface board provides multiple network users with concurrent and independent access to each of the other option boards connected to the MDC.

12. A networkable digital copier according to claim 11, wherein said network interface board accesses the other option boards via master/slave communication routed through the MDC.

13. A networkable digital copier according to claim 10, wherein said network interface board interfaces the printer part and the scanner part via master/slave communication with the MDC over the MDC bus.

14. A network interface board according to claim 10, further comprising a persistent memory for storing thereon a multitasking operating system, and network communication software, a print server and a scan server, wherein said multitasking processor operates in accordance with said multitasking operating system so as to process network communications via the network communication stack and so as to process requests for print services in accordance with the print server and for processing requests for scan services in accordance with the scan server.

15. A network interface board according to claim 14, wherein said persistent memory also stores at least one additional server, and wherein said multitasking processor concurrently processes requests for services of said peripheral server concurrently with other servers, and wherein said core board has connected thereto a peripheral board whose functionality is exported to the local area network via the additional peripheral server on said persistent memory.

16. A network interface board according to claim 15, wherein said network interface board communicates to said peripheral board via master/slave communication coordinated by said core board.

17. A network interface board according to claim 15, wherein said additional peripheral board is comprised by a facsimile board and wherein said peripheral server is a facsimile server.

18. A network interface board according to claim 15, wherein said additional peripheral board is comprised by an image processing board and wherein said peripheral server is a image processing server.

19. A network interface board according to claim 10, wherein said network interface board includes dynamic random access memory exceeding 1 MB in capacity.

20. A method of servicing requests for network service received at a network interface board coupled between a local area network (LAN) and a copier via a core board, the requests for network service being received directly from the LAN and from the copier via the core board, said method comprising the steps of:

initializing the network interface board using configuration parameters stored in a memory on the network interface board so as to enable the network interface board to interface the copier to the LAN;

storing a plurality of network servers into a memory on the network interface board, the plurality of network servers being executed in response to received requests for network service;

receiving requests for network service; and servicing each request for network service by executing a network server which corresponds to the request for network service, the requests for network service being serviced concurrently by a multi-tasking operating system, the requests for network service being serviced by:

issuing, in response to an access inquiry received from a core board over a CPU bus, a request to the core board over the CPU bus for further commands including commands to read or write video data over a video bus;

receiving, from the core board over the CPU bus, a command to read or write video data to the video bus; and reading or writing the video data to the video bus in response to a command received from the core board over the CPU bus.

21. A method according to claim 20, wherein said storing step comprises storing a multi-tasking operating system, network communication software, a print server, and a scan server; and wherein said servicing step services requests for print services by executing the print server, and requests for scan services by executing the scan server.

22. A method according to claim 20, wherein said servicing step comprises executing the network server which corresponds to the request for network service until completion and concurrently servicing additional requests for network service.

23. A computer-readable medium for storing computer-executable process steps, said process steps to service requests for network service received at a network interface board coupled between a local area network (LAN) and a copier via a core board, the requests for network service being received directly from the LAN and from the copier via the core board, said process steps comprising:

an initializing step to configure the network interface board using configuration parameters stored in a memory on the network interface board so as to enable the network interface board to interface the copier to the LAN;

a storing step to store a plurality of network servers into a memory on the network interface board, the plurality of network servers being executed in response to received requests for network service;

a receiving step to receive requests for network service; and a servicing step to service each request for network service by executing a network server which corresponds to the request for network service, the requests for network service being serviced concurrently by a multi-tasking operating system, the requests for network service being serviced by:

an issuing step to issue, in response to an access inquiry received from a core board over a CPU bus, a request to the core board over the CPU bus for further commands including commands to read or write video data over a video bus;

a receiving step to receive, from the core board over the CPU bus, a command to read or write video data to the video bus; and a step to read or write the video data to the video bus in response to a command received from the core board over the CPU bus.

24. A computer-readable medium according to claim 23, wherein said storing step comprises steps to store a multi-tasking operating system, network communication software, a print server, and a scan server; and wherein said servicing step includes steps to service requests for print services by executing the print server, and to receive requests for scan services by executing the scan server.

25. A computer-readable medium according to claim 23, wherein said servicing step comprises steps to execute the network server which corresponds to the request for network service until completion, and steps to service concurrently additional requests for network service.

26. Computer-executable process steps stored on a computer-readable medium, said process steps to service requests for network service received at a network interface board coupled between a local area network (LAN) and a copier via a core board, the requests for network service being received directly from the LAN and from the copier via the core board, said process steps comprising:

code to configure the network interface board using configuration parameters stored in a memory on the network interface board so as to enable the network interface board to interface the copier to the LAN;

code to store a plurality of network servers into a memory on the network interface board, the plurality of network servers being executed in response to received requests for network service;

code to receive requests for network service; and code to service each request for network service by executing a network server which corresponds to the request for network service, the requests for network service being serviced concurrently by a multi-tasking operating system, the requests for network service being serviced by:

code to issue, in response to an access inquiry received from a core board over a CPU bus, a request to the core board over the CPU bus for further commands including commands to read or write video data over a video bus;

code to receive, from the core board over the CPU bus, a command to read or write video data to the video bus; and code to read or write the video data to the video bus in response to a command received from the core board over the CPU bus.

27. Computer executable process steps according to claim 26, wherein said storing code comprises code to store a multi-tasking operating system, network communication software, a print server, and a scan server; and wherein said servicing code includes code to service requests for print services by executing the print server, and to receive requests for scan services by executing the scan server.

28. Computer-executable process steps according to claim 26, wherein said servicing code comprises code to execute the network server which corresponds to the request for network service until completion, and code to service concurrently additional requests for network service.

* * * * *